(12) United States Patent
Lai et al.

(10) Patent No.: US 12,504,888 B2
(45) Date of Patent: Dec. 23, 2025

(54) DATA ACCESS METHOD OF SOLID-STATE DRIVE DEVICE AND SOLID-STATE DRIVE DEVICE

(71) Applicant: INNODISK CORPORATION, New Taipei (TW)

(72) Inventors: Chung-Yi Lai, New Taipei (TW); Chen-Xing Chang, New Taipei (TW)

(73) Assignee: INNODISK CORPORATION, New Taipei (TW)

( * ) Notice: Subject to any disclaimer, the term of this patent is extended or adjusted under 35 U.S.C. 154(b) by 0 days.

(21) Appl. No.: 18/739,337

(22) Filed: Jun. 11, 2024

(65) Prior Publication Data

US 2025/0348229 A1 Nov. 13, 2025

(30) Foreign Application Priority Data

May 10, 2024 (TW) ................................ 113117271

(51) Int. Cl.
*G06F 3/06* (2006.01)

(52) U.S. Cl.
CPC .......... *G06F 3/0619* (2013.01); *G06F 3/0659* (2013.01); *G06F 3/0679* (2013.01)

(58) Field of Classification Search
CPC ..... G06F 3/0619; G06F 3/0659; G06F 3/0679
See application file for complete search history.

(56) References Cited

U.S. PATENT DOCUMENTS

| | | | |
|---|---|---|---|
| 2016/0259589 A1* | 9/2016 | Zettsu | G06F 1/3287 |
| 2020/0081777 A1* | 3/2020 | Lee | G11C 11/408 |
| 2022/0262427 A1* | 8/2022 | Krishnakumar | G11C 5/14 |
| 2024/0069728 A1* | 2/2024 | Toronyi | G06F 3/0629 |
| 2024/0070061 A1* | 2/2024 | Narum | G06F 1/3225 |

* cited by examiner

*Primary Examiner* — Hiep T Nguyen

(57) ABSTRACT

A data access method of a solid-state drive (SSD) device includes storing data into a volatile memory or reading the data from the volatile memory according to an instruction from a host. Next, upon receiving a shutdown command from the host or detecting a power-off signal, transferring the data stored in the volatile memory to a non-volatile memory from mapping data of the volatile memory to a physical address of the non-volatile memory to accordingly perform a data storage process. Then, upon receiving a boot command from the host, transferring the data stored in the non-volatile memory to the volatile memory from mapping data of the non-volatile memory to a physical address of the volatile memory to accordingly perform a data loading process.

8 Claims, 3 Drawing Sheets

DATA ACCESS METHOD OF SOLID-STATE DRIVE DEVICE AND SOLID-STATE DRIVE DEVICE

CROSS-REFERENCE TO RELATED APPLICATION

This non-provisional application claims priority under 35 U.S.C. § 119 (a) on Patent Application No(s). 113117271 filed in Taiwan, R.O.C. on May 10, 2024, the entire contents of which are hereby incorporated by reference.

BACKGROUND OF THE INVENTION

1. Field of the Invention

The present disclosure relates to a data storage device, and in particular to a data access method of a solid-state drive (SSD) device and an SSD device.

2. Description of the Related Art

An SSD device is a data storage device based on integrated circuits, and a conventional SSD device utilizes a non-volatile memory as a primary data storage element.

In recent years, SSD devices, compared with conventional hard drives, feature advantages of being compact, more durable, lighter in weight, more readily portable, noise-free, and faster access speed, and are thus popular among users. In response to an application requirement of a rapidly increasing data amount, SSD device manufacturers have also aggressively increased the storage capacity so as to meet the application requirements above. However, along with the increase in the storage capacity of SSD devices, access performance of the SSD devices may become affected, and data may also be lost.

The reason accounting for the above is that current SSD devices mostly adopt an access method based on a mapping table. A mapping table refers to an address mapping table, for example, a logical-to-physical (L2P) mapping table listing correspondence between logical addresses and physical addresses (for example, logical page numbers to physical page numbers). When an SSD device writes each set of data into a non-volatile memory address space, a mapping relationship of this logical address to a physical address is recorded, and such mapping relationship forms the L2P table. When a host is to read the set of data, the SSD device looks up the L2P table for a physical page number corresponding to a logical page number, and then accesses the non-volatile memory to read and provide the data to the host.

In a normal operation condition, the L2P table resides in a dynamic random access memory (DRAM), and thus the L2P table needs to occupy a space of the DRAM. Moreover, during a data access process, the data is stored in a predetermined address by looking up the L2P table or data is read from a predetermined address, and a data access speed is inevitably affected. Under the same condition, a duplicate of the L2P table is also stored in the non-volatile memory, so as to instantly recover the state of the L2P table during bootup. In the event of an abnormality of the SSD device, if the SSD device has a large storage capacity, an extremely long period of time is needed in order to recover the L2P table by reading it from the non-volatile memory or by other means. In the event of a severe condition such that the L2P table cannot be recovered, data loss occurs.

BRIEF SUMMARY OF THE INVENTION

Due to an additional management mechanism (that is, the L2P table) needed in a current SSD device, the management mechanism above inevitably affects a data access speed of an SSD device with a large storage capacity, and performance of the SSD device is also affected while the management mechanism is executed. In addition, there is also an issue of data loss occurring from a recovery failure of the L2P table due to an abnormality.

To overcome the issues above, it is an object of the present disclosure to provide a data access method of a solid-state drive (SSD) device. The SSD device is adapted to communicate with a host, and includes a controller, a volatile memory, and a non-volatile memory electrically coupled to the volatile memory. The data access method includes steps of: a controller storing data into the volatile memory or reading the data from the volatile memory according to an instruction from the host; when the controller receives a shutdown command from the host or detects a power-off signal, transferring the data stored in the volatile memory to the non-volatile memory from mapping data of the volatile memory to a physical address of the non-volatile memory to accordingly perform a data storage process; and when the controller receives a boot command from the host, transferring the data stored in the non-volatile memory to the volatile memory from the mapped data of the non-volatile memory to a physical address of the volatile memory to perform a data loading process.

In some embodiments, when the controller receives the shutdown command from the host, the host shuts down in response to a data storage complete message returned from the SSD device.

In some embodiments, the SSD device is further electrically coupled to a backup power supply. When the power-off signal is detected, the backup power supply provides power to the SSD device to transfer the data stored in the volatile memory to the non-volatile memory from mapping data of the volatile memory to a physical address of the non-volatile memory to accordingly perform the data storage process.

In some embodiments, the process of transferring data stored in non-volatile memory to volatile memory, for data loading, includes mapping the data from the non-volatile memory to a physical address of the volatile memory, and also includes decompression of the data for the data loading process.

To overcome the issues above, it is another object of the present disclosure to provide a solid-state drive (SSD) device adapted to communicate with a host so as to transmit data. The SSD device is configured to perform a data access method including steps of: a controller storing the data into a volatile memory or reading the data from the volatile memory according to an instruction from the host; when the controller receives a shutdown command from the host or detects a power-off signal, transferring the data stored in the volatile memory to the non-volatile memory from mapping data of the volatile memory to a physical address of the non-volatile memory to accordingly perform a data storage process; and when the controller receives a boot command from the host, transferring the data stored in the non-volatile memory to the volatile memory from the mapped data of the non-volatile memory to a physical address of the volatile memory to accordingly perform a data loading process.

In conclusion, the data access method of an SSD device and the SSD device of the present disclosure utilize a volatile memory in an SSD device as a primary data storage element for performing a data access process. Since performance of a volatile memory is far better than that of a non-volatile memory, a high data access speed can be achieved. In case of shutdown or power-off, data is stored back into the non-volatile memory of the SSD device, and in case of bootup or power resume, the data is again loaded from the non-volatile memory of the SSD device into the volatile memory of the SSD device, so as to complete an overall operating process for data access. Thus, a data access speed of the SSD device can be effectively enhanced. Moreover, because the present disclosure stores and reads data by using a non-L2P table access method and does not require an additional management mechanism, operational performance of the SSD device can be improved without causing data loss resulting from a recovery failure of an L2P table due to an abnormality, further enhancing operational stability of the SSD device.

DETAILED DESCRIPTION OF THE INVENTION

To facilitate understanding of the object, characteristics, and effects of the present disclosure, embodiments together with the attached drawings for the detailed description of the present disclosure are provided.

Figure 1:
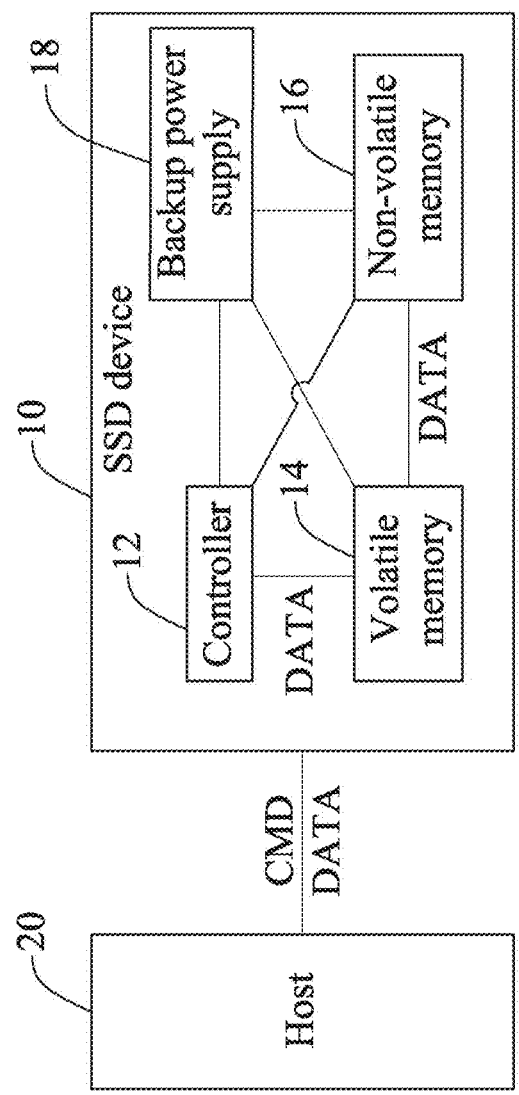
FIG. 1 is a block diagram of a solid-state drive (SSD) device according to an embodiment of the present disclosure.

Refer to FIG. 1 showing a block diagram of a solid-state drive (SSD) device 10 according to an embodiment of the present disclosure. The SSD device 10 can be electrically coupled to a host 20 via a data bus interface. The SSD device 10 can communicate with the host 20 so as to transmit a command CMD and/or data DATA. In an embodiment, the SSD device 10 and the host 20 can be disposed in the same computer device. In other embodiments, the SSD device 10 can be disposed outside the host 20. In other words, the SSD device 10 and the host 20 can be disposed in separate computer devices. The data bus interface above can include Serial Advanced Technology Attachment (SATA), hard drive architecture (for example, SATA-1, SATA-2, and SATA-3), and Peripheral Component Interconnect express (PCIe) architecture (for example, PCIe Gen1, PCIe Gen2, PCIe Gen3, and PCIe Gen4). The SSD device 10 is adapted to communicate with the host 20. The SSD device 10 can include a controller 12, a volatile memory 14, a non-volatile memory 16, and a backup power supply 18. In other embodiments, the backup power supply 18 can be omitted, and a power supply from the host 20 is used to maintain power needed for operating the SSD device 10.

The controller 12 is configured to be able to execute software programs or firmware programs so as to implement computer functions. The controller 12 can be, for example, a central processor, a system-on-chip (SoC), a field programmable gate array (FPGA), an application-specific integrated circuit (ASIC), a microcontroller unit (MCU), a digital signal processor (DSP), a programmable logic device (PLD), or other types of controller. In an embodiment, the controller 12 can implement a function of the data access method by executing a firmware code stored in the non-volatile memory 16.

The volatile memory 14 is electrically coupled to the controller 12. The volatile memory 14 is configured as a primary data storage element performing data access process. The term "primary" refers to a stage in which the host 20 is powered on and in operation, that is, a non-shutdown state. For example, when the SSD device 10 stores the data DATA according to the command CMD, the data DATA can be stored in the volatile memory 14. When the controller 12 of the SSD device 10 reads the data DATA according to the command CMD, the data DATA is read from the volatile memory 14. More specifically, during a stage in which the host 20 is powered on and in operation, the SSD device 10 transfers the data DATA to the volatile memory 14 from mapping data of the non-volatile memory 16 to a physical address of the volatile memory 14, and performs operations such as writing, erasing, storing, and reading the data DATA in the volatile memory 14 according to the command CMD from the host 20.

Moreover, the volatile memory 14 can include, for example, a static random-access memory (SRAM), a dynamic random-access memory (DRAM), and a synchronous dynamic random-access memory (SDRAM).

It should be noted that, since units for writing into and erasing from the volatile memory 14 are the same, it means that the data DATA stored in the volatile memory 14 can be directly overwritten without management using an L2P table. Thus, compared with a conventional access method of using an L2P table, this embodiment utilizes the volatile memory 14 as a primary data storage element performing data access processing. Since looking up an L2P table is not necessary, a data access speed and operational performance of the SSD device 10 can be improved without causing data loss resulting from a recovery failure of an L2P table due to an abnormality, further enhancing operational stability of the SSD device 10.

The non-volatile memory 16 is electrically coupled to the controller 12 and the volatile memory 14. The non-volatile memory 16 is configured as a secondary data storage element performing data access process. The term "secondary" refers to a stage in which the host 20 is powered off, that is, a shutdown state.

For example, when the controller 12 of the SSD device 10 is going to store the data DATA according to the command CMD or a power-off signal, the data DATA stored in the volatile memory 14 is transferred to and stored in the non-volatile memory 16.

More specifically, when the controller 12 of the SSD device 10 receives a shutdown command from the host 20 or detects a power-off signal, the SSD device 10 transfers the data DATA stored in the volatile memory 14 to the non-volatile memory 16 for storing therein from mapping data of the volatile memory 14 to a physical address of the non-volatile memory 16. Moreover, when the storage operation above is completed, the controller 12 of the SSD device 10 returns a data storage complete message to the host 20 to prompt the host 20 to shut down. In brief, when the controller 12 of the SSD device 10 receives a shutdown command from the host 20 or detects a power-off signal, the host 20 can shut down in response to the data storage complete message returned from the controller 12 of the SSD device 10, thereby ensuring that data DATA is not lost due to incomplete data transfer.

In addition, the non-volatile memory 16 can be, for example, a read only memory (ROM), programmable read only memory (PROM), an erasable programmable read only memory (EPROM), an electrically-erasable programmable read-only memory (EEPROM), a flash memory, a spin torque transfer random access memory (STTRAM), a resistive random access memory (RRAM), a ferroelectric random access memory (FRAM), a magnetoresistive random access memory (MRAM), or a racetrack memory. In an embodiment, a storage capacity of the non-volatile memory 16 can be configured to be greater than a storage capacity of the volatile memory 14, so as to ensure that the data DATA can be completely transferred between the non-volatile memory 16 and the volatile memory 14. In other embodiments, the storage capacity of the non-volatile memory 16 can also be configured to be equal to the storage capacity of the volatile memory 14.

The backup power supply 18 is electrically coupled to the controller 12, the volatile memory 14 and the non-volatile memory 16. During a period in which the SSD device 10 has no power supply, the backup power supply 18 can be configured to be activated and provide power needed for operating the controller 12, the volatile memory 14, and the non-volatile memory 16 in such period, so that the SSD device 10 can perform and complete the operation of transferring the data DATA from the volatile memory 14 to the non-volatile memory 16 for further storage. The backup power supply 18 can consist of a capacitor and/or a battery. In an embodiment, the backup power supply 18 can be disposed inside the SSD device 10 along with the controller 12, the volatile memory 14, and the non-volatile memory 16, and can be electrically coupled to the controller 12, the volatile memory 14, and the non-volatile memory 16 by a switch circuit (not shown in the drawings), and an electrical path. In other embodiments, the backup power supply 18 can also be separately disposed outside the SSD device 10. Similarly, the SSD device 10 can allow the backup power supply 18 to be electrically coupled to the controller 12, the volatile memory 14, and the non-volatile memory 16 via a switch circuit and an electrical path.

Figure 2A:
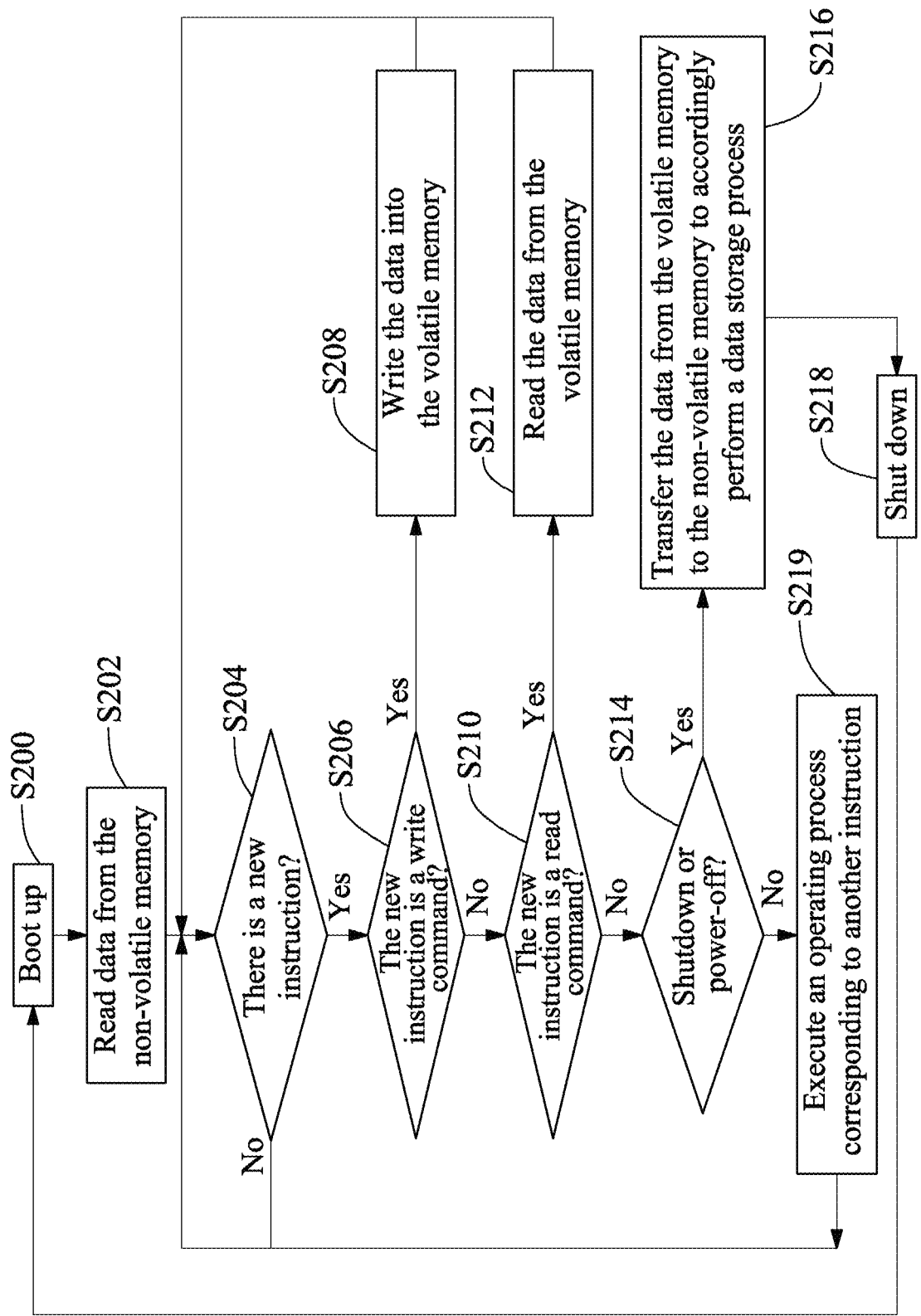
FIG. 2A is a flowchart of a data access method of an SSD device according to an embodiment of the present disclosure.

Referring to both FIG. 1 and FIG. 2A, FIG. 2A shows a flowchart of a data access method of the SSD device 10 according to an embodiment of the present disclosure.

In step S200, the host 20 is booted, and can transmit a boot command or a signal to the controller 12 of the SSD device 10.

In step S202, the SSD device 10 reads the data DATA from the non-volatile memory 16, and transfers the data DATA to the volatile memory 14. More specifically, when the controller 12 of the SSD device 10 receives a boot command or a power signal from the host 20, the data DATA stored in the non-volatile memory 16 can be transferred to the volatile memory 14 from mapping data of the non-volatile memory 16 to a physical address of the volatile memory 14 to accordingly perform a data loading process. For example, taking the storage capacity of the volatile memory 14 as 120 GB for instance, the physical addresses can be from 00 0000 0000H to 1D FFFF FFFFH, and the non-volatile memory 16 has a storage capacity and physical addresses corresponding to those of the volatile memory 14.

In step S204, the controller 12 of the SSD device 10 detects whether there is a new instruction from the host 20. If a result of the determination is "no", it means that there is no new instruction from the host 20, and the method repeats step S204. If the result of the determination is "yes", it means that there is a new instruction from the host 20, and the method proceeds to step S206.

In step S206, the controller 12 of the SSD device 10 determines whether the new instruction is a write command. If a result of the determination is "no", it means that the new instruction is not a write command, and the method proceeds to step S210. If the result of the determination is "yes", it means that the new instruction is a write command, and the method proceeds to step S208.

In step S208, the controller 12 of the SSD device 10 writes the data DATA to the volatile memory 14 according to the write command. Once the writing operation above is completed, the SSD device 10 can return a data write complete message to the host 20, and the method proceeds to step S204.

In step S210, the controller 12 of the SSD device 10 determines whether the new instruction is a read command. If a result of the determination is "no", it means that the new instruction is not a read command, and the method proceeds to step S214. If the result of the determination is "yes", it means that the new instruction is a read command, and the method proceeds to step S212.

In step S212, the controller 12 of the SSD device 10 can read the data DATA from the volatile memory 14 according to the read command and provide the data DATA to the host 20. Once the reading operation above is completed, the controller 12 of the SSD device 10 can return a data read complete message to the host 20, and the method proceeds to step S204.

In step S214, the controller 12 of the SSD device 10 determines whether a shutdown command from the host 20 is received or whether a power-off signal is detected. When a result of the determination is "no", it means that the new instruction is not a shutdown command or a power-off signal is not detected, and the method proceeds to step S219. If the result of the determination is "yes", it means that the new instruction is a shutdown command or a power-off signal is detected, and the method proceeds to step S216.

In step S216, the controller 12 of the SSD device 10 transfers the data DATA stored in the volatile memory 14 to the non-volatile memory 16 from mapping data of the volatile memory 14 to a physical address of non-volatile memory 16 to accordingly perform a data storage process, and the method proceeds to step S218. In an embodiment, the SSD device 10 is further electrically coupled to the backup power supply 18. When the controller 12 of the SSD device 10 detects the power-off signal, the backup power supply 18 provides power to the SSD device 10, so as to transfer the data DATA stored in the volatile memory 14 to the non-volatile memory 16 from mapping data of the volatile memory 14 to a physical address of the non-volatile memory 16 to accordingly perform the data storage process. The power-off signal above can be transmitted by an additional detection circuit (not shown in the drawings) to the controller 12 of the SSD device 10, and the detection circuit can be used to detect whether power supplied by the host 20 is abnormally interrupted or detect whether power supplied to the SSD device 10 is abnormally interrupted, and transmit the power-off signal to the SSD device 10 upon detecting the abnormal power interruption.

In step S218, the host 20 can shut down according to the data storage complete message returned from the controller 12 of the SSD device 10. More specifically, once the controller 12 of the SSD device 10 receives the shutdown command from the host 20 and completes the data storage process, the controller 12 of the SSD device 10 further returns the data storage complete message to the host 20, and the host 20 can shut down in response to the data storage complete message returned from the controller 12 of the SSD device 10.

In step S219, the SSD device 10 can perform an operating process corresponding to another instruction according to another instruction from the host 20.

Figure 2B:
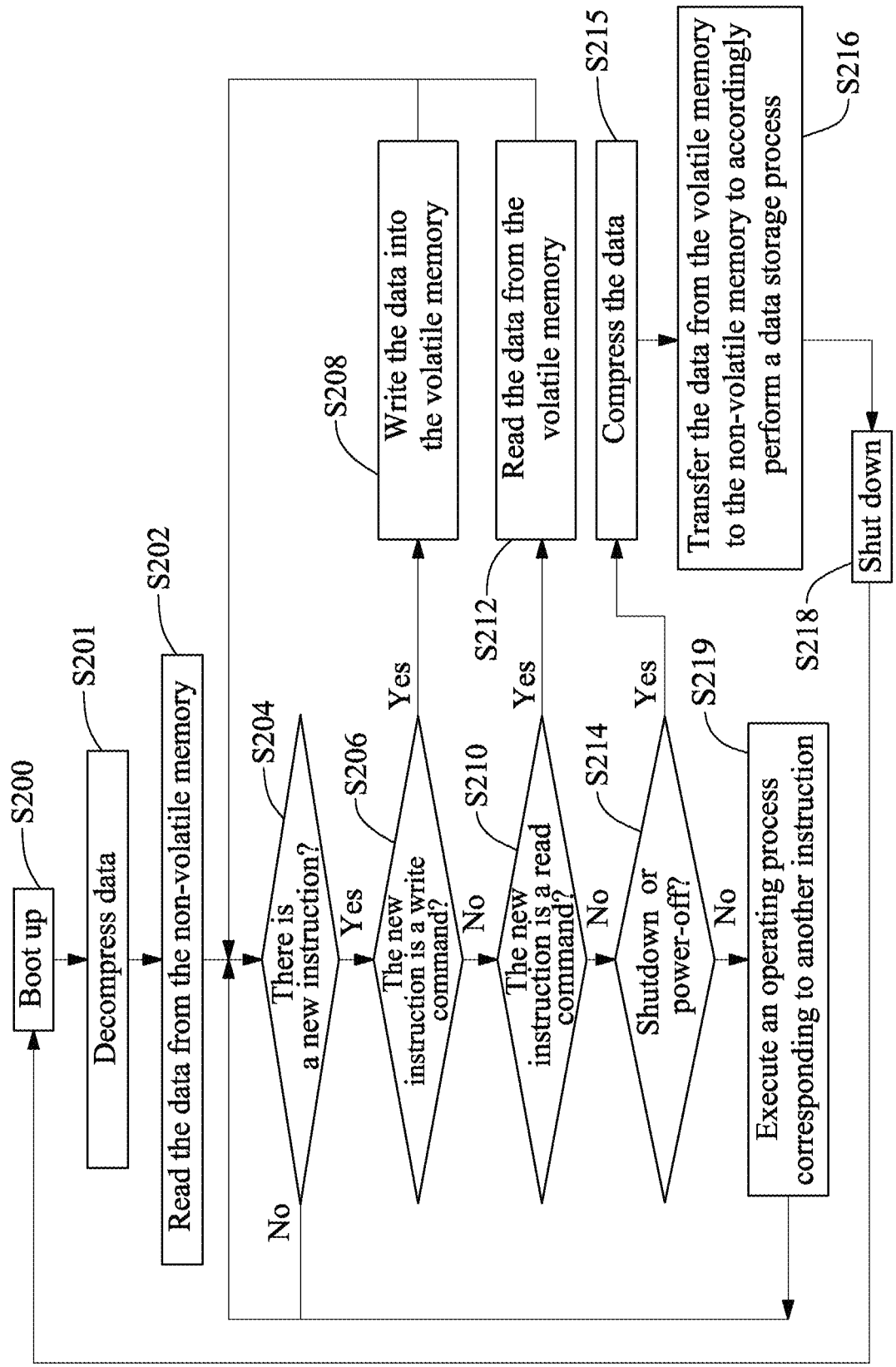
FIG. 2B is a flowchart of a data access method of an SSD device according to another embodiment of the present disclosure.

Referring to both FIG. 1 and FIG. 2B, FIG. 2B shows a flowchart of a data access method of the SSD device 10 according to an embodiment of the present disclosure.

In step S200, the host 20 is booted, and can transmit a boot command or a signal to the SSD device 10.

In step S201, the controller 12 of the SSD device 10 decompresses the data DATA stored in the non-volatile memory 16 to perform a data loading process. For example but not limited to, the data DATA can be decompressed by using an LZ77 lossless data compression algorithm or an LZ78 lossless data compression algorithm.

In step S202, the controller 12 of the SSD device 10 reads the data DATA (or the decompressed data DATA) from the non-volatile memory 16, and transfers the data DATA to the volatile memory 14. More specifically, when the controller 12 of the SSD device 10 receives a boot command or a power signal from the host 20, the data DATA stored in the non-volatile memory 16 can be transferred to the volatile memory 14 from mapping data of the non-volatile memory 16 to a physical address of the volatile memory 14 to accordingly perform a data loading process. More specifically, when the controller 12 of the SSD device 10 receives a boot command or a power signal from the host 20, the data DATA stored in the non-volatile memory 16 can be transferred to the volatile memory 14 from mapping data of the non-volatile memory 16 to a physical address of the volatile memory 14 to accordingly perform the data loading process. For example, taking the storage capacity of the volatile memory 14 as 120 GB for instance, the physical addresses can be from 00 0000 0000H to 1D FFFF FFFFH, and the non-volatile memory 16 has a storage capacity and physical addresses corresponding to those of the volatile memory 14.

In step S204, the controller 12 of the SSD device 10 continuously detects whether there is a new instruction from the host 20. If a result of the determination is "no", it means that there is no new instruction from the host 20, and the method repeats step S204. If the result of the determination is "yes", it means that there is a new instruction from the host 20, and the method proceeds to step S206.

In step S206, the controller 12 of the SSD device 10 determines whether the new instruction is a write command. If a result of the determination is "no", it means that the new instruction is not a write command, and the method proceeds to step S210. If the result of the determination is "yes", it means that the new instruction is a write command, and the method proceeds to step S208.

In step S208, the controller 12 of the SSD device 10 writes the data DATA to the volatile memory 14 according to the write command. Once the writing operation above is completed, the controller 12 of the SSD device 10 can return a data write complete message to the host 20, and the method proceeds to step S204.

In step S210, the controller 12 of the SSD device 10 determines whether the new instruction is a read command. If a result of the determination is "no", it means that the new instruction is not a read command, and the method proceeds to step S214. If the result of the determination is "yes", it means that the new instruction is a write command, and the method proceeds to step S212.

In step S212, the controller 12 of the SSD device 10 can read the data DATA from the volatile memory 14 according to the read command. Once the reading operation above is completed, the controller 12 of the SSD device 10 can return a data read complete message to the host 20, and the method proceeds to step S204.

In step S214, the controller 12 of the SSD device 10 determines whether a shutdown command from the host 20 is received or whether a power-off signal is detected. When a result of the determination is "no", it means that the new instruction is not a shutdown command or a power-off signal is not detected, and the method proceeds to step S219. If the result of the determination is "yes", it means that the new instruction is a shutdown command or a power-off signal is detected, and the method proceeds to step S215.

In step S215, the controller 12 of the SSD device 10 compresses the data DATA. For example but not limited to, the data DATA can be compressed by using an LZ77 lossless data compression algorithm or an LZ78 lossless data compression algorithm. Thus, a storage space that the data DATA occupies in the non-volatile memory 16 can be reduced. In an embodiment, the operation of compressing the data DATA can also be performed in the volatile memory 14. In other embodiments, the operation of compressing the data DATA can also be performed in the non-volatile memory 16. In other embodiments, step S215 can be omitted, and step S201 can be correspondingly omitted when step S215 is omitted.

In step S216, the controller 12 of the SSD device 10 transfers the data DATA (or the compressed data DATA) stored in the volatile memory 14 to the non-volatile memory 16 from mapping data of the volatile memory 14 to a physical address of the non-volatile memory 16 to accordingly perform a data storage process, and the method proceeds to step S218. Once the SSD device 10 completes the data storage process, a data storage complete message can be returned to the host 20. In an embodiment, when the controller 12 of the SSD device 10 detects the power-off signal, the backup power supply 18 provides power to the SSD device 10, so as to transfer the data DATA stored in the volatile memory 14 to the non-volatile memory 16 from mapping data of the volatile memory 14 to a physical address of the non-volatile memory 16 to accordingly perform the data storage process. The power-off signal above can be transmitted by an additional detection circuit (not shown in the drawings) to the controller 12 of the SSD device 10, and the detection circuit can be used to detect whether power supplied by the host 20 is abnormally interrupted or detect whether power supplied to the SSD device 10 is abnormally interrupted, and transmit the power-off signal to the SSD device 10 upon detecting the abnormal power interruption.

In step S218, the host 20 can shut down according to the data storage complete message returned from the SSD device 10. More specifically, once the controller 12 of the SSD device 10 receives the shutdown command from the host 20 and completes the data storage process, the controller 12 of the SSD device 10 further returns the data storage complete message to the host 20, and the host 20 can shut down in response to the data storage complete message returned from the controller 12 of the SSD device 10.

In step S219, the SSD device 10 can perform an operating process corresponding to another instruction according to another instruction from the host 20.

In conclusion, the data access method of an SSD device and the SSD device of the present disclosure utilize a volatile memory in an SSD device as a primary data storage element for performing a data access process. Since performance of a volatile memory is far better than that of a non-volatile memory, a high data access speed can be achieved. In case of shutdown or power-off, data is stored back into the non-volatile memory of the SSD device, and in case of bootup or power resume, the data is again loaded from the non-volatile memory of the SSD device into the volatile memory of the SSD device, so as to complete an overall operating process for data access. Thus, the data access speed of the SSD device can be effectively enhanced. Moreover, because the present disclosure stores and reads data by using a non-L2P table access method and does not require an additional management mechanism, operational performance of the SSD device can be improved without causing data loss occurring from a recovery failure of an L2P table due to an abnormality, further enhancing operational stability of the SSD device.

While the present invention has been described by means of specific embodiments, numerous modifications and variations could be made thereto by those skilled in the art without departing from the scope and spirit of the present invention set forth in the claims.

What is claimed is:

1. A data access method of a solid state drive (SSD) device, the SSD device adapted to communicate with a host and comprising a controller, a volatile memory, and a non-volatile memory electrically coupled to the volatile memory; the data access method comprising steps of:
   the controller storing data in the volatile memory or reading the data from the volatile memory according to an instruction from the host;
   when the controller receives a shutdown command from the host or detects a power-off signal, transferring the data stored in the volatile memory to the non-volatile memory in a manner that a physical address of the volatile memory corresponds to a physical address of the non-volatile memory to accordingly perform a data storage process; and
   when the controller receives a boot command from the host, transferring the data stored in the non-volatile memory to the volatile memory in the manner that the physical address of the non-volatile memory to the physical address of the volatile memory to accordingly perform a data loading process,
   wherein when the controller receives the shutdown command from the host, the host shuts down in response to a data storage complete message returned from the SSD device.

2. The data access method according to claim 1, wherein the SSD device is further electrically coupled to a backup power supply; when the controller detects the power-off signal, the backup power supply provides power to the SSD device, so as to transfer the data stored in the volatile memory to the non-volatile memory in the manner that the physical address of the volatile memory to the physical address of the non-volatile memory to accordingly perform the data storage process.

3. The data access method according to claim 1, wherein the step of transferring the data stored in the volatile memory to the non-volatile memory in the manner that the physical address of the volatile memory to the physical address of the non-volatile memory to accordingly perform a data storage process further comprises compressing the data to perform the data storage process.

4. The data access method according to claim 3, wherein the step of transferring the data stored in the non-volatile memory to the volatile memory in the manner that the physical address of the non-volatile memory to the physical address of the volatile memory to accordingly perform a data loading process further comprises decompressing the data to perform the data loading process.

5. A solid-state drive (SSD) device, adapted to communicate with a host to transmit data, the SSD device comprising:
   a controller, configured to be able to execute software programs or firmware programs so as to implement computer functions;
   a volatile memory, electrically coupled to the controller, wherein the volatile memory is configured as a primary data storage element performing data access process;
   a non-volatile memory, electrically coupled to the controller and the volatile memory, wherein the non-volatile memory is configured as a secondary data storage element performing data access process,
   wherein the controller storing data in the volatile memory or reading the data from the volatile memory according to an instruction from the host;
   when the controller receives a shutdown command from the host or detects a power-off signal, transferring the data stored in the volatile memory to the non-volatile memory in a manner that a physical address of the volatile memory to a physical address of the non-volatile memory to accordingly perform a data storage process; and
   when the controller receives a boot command from the host, transferring the data stored in the non-volatile memory to the volatile memory in the manner that the physical address of the non-volatile memory to the physical address of the volatile memory to accordingly perform a data loading process,
   wherein once the controller receives the shutdown command from the host and the data storage process is completed, the controller further performs a process of returning the data storage complete message to the host to prompt the host to shut down in response to the data storage complete message.

6. The SSD device according to claim 5, wherein the SSD device is further electrically coupled to a backup power supply; when the controller detects the power-off signal, the backup power supply provides power to the SSD device, so as to transfer the data stored in the volatile memory to the non-volatile memory in the manner that the physical address of the volatile memory to the physical address of the non-volatile memory to accordingly perform the data storage process.

7. The SSD device according to claim 5, wherein the step of transferring the data stored in the volatile memory to the non-volatile memory in the manner that the physical address of the volatile memory to the physical address of the non-volatile memory to accordingly perform a data storage process further comprises compressing the data to perform the data storage process.

8. The SSD device according to claim 7, wherein the step of transferring the data stored in the non-volatile memory to the volatile memory in the manner that the physical address of the non-volatile memory to the physical address of the volatile memory to accordingly perform a data loading process further comprises decompressing the data to perform the data loading process.

* * * * *